T. SPOONER.
TEMPERATURE MEASURING INSTRUMENT.
APPLICATION FILED MAY 28, 1913.
1,227,337.
Patented May 22, 1917.
Fig. 1.
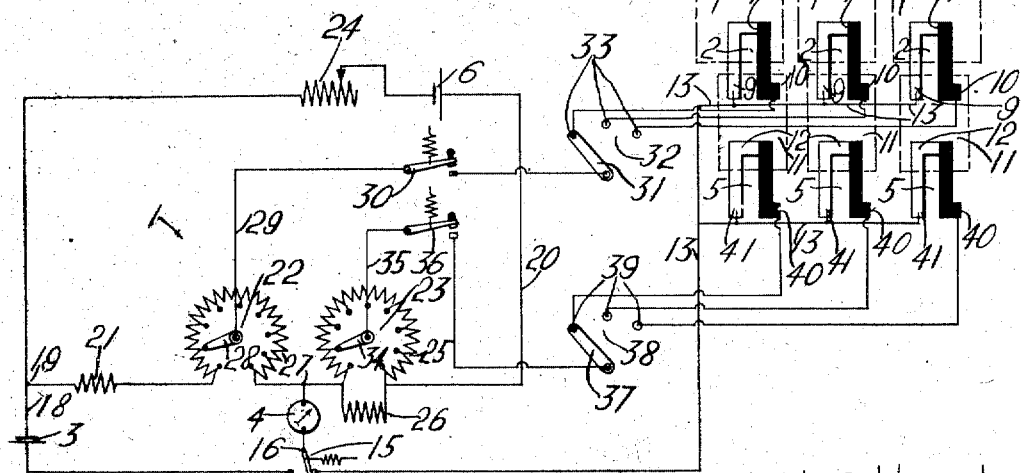
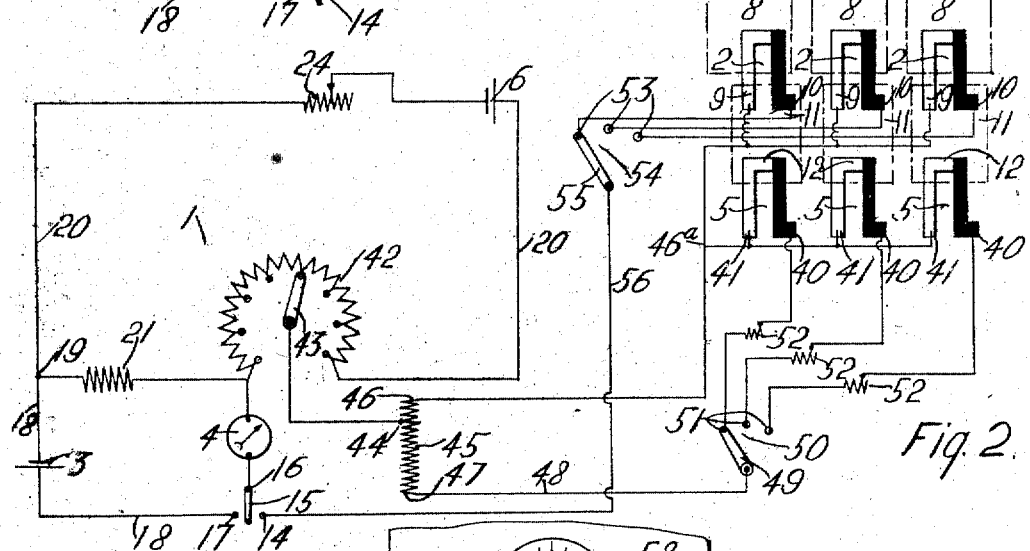
Fig. 2.
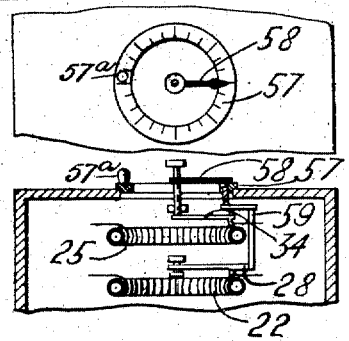
Fig. 3.
Fig. 4.
WITNESSES:
Fred A. Lind.
J H Procter
INVENTOR
Thomas Spooner
BY
Wesley G. Carr
ATTORNEY

UNITED STATES PATENT OFFICE.

THOMAS SPOONER, OF WILKINSBURG, PENNSYLVANIA, ASSIGNOR TO WESTINGHOUSE ELECTRIC AND MANUFACTURING COMPANY, A CORPORATION OF PENNSYLVANIA.

TEMPERATURE-MEASURING INSTRUMENT.

1,227,337.

Specification of Letters Patent.  Patented May 22, 1917.

Application filed May 28, 1913.  Serial No. 770,476.

*To all whom it may concern:*

Be it known that I, THOMAS SPOONER, a citizen of the United States, and a resident of Wilkinsburg, in the county of Allegheny and State of Pennsylvania, have invented a new and useful Improvement in Temperature-Measuring Instruments, of which the following is a specification.

My invention relates to temperature-measuring instruments and particularly to thermo-couple potentiometers.

The object of my invention is to provide a potentiometer for accurately measuring the temperature of a thermo-couple, correcting for the temperature of the cold junction of the same.

A thermo-electric generator or a thermo-couple that is adapted to measure temperature variations, must have some electrical measuring instrument, such as a potentiometer, for indicating its voltage variations, which are proportional to the difference in temperatures of its hot and cold junctions. The usual thermo-couple for accurate temperature measurements, consists of two dissimilar metals joined together at one point, each having high thermo-electric power and neither having an inversion of its thermo-electric properties within the limits of temperature for which the couple is to be used. The cold junctions of the thermo-couple are subject to temperature variations that are due to conduction and radiation; hence, for accurate measurements of temperature, it is essential to know the temperature of the cold junctions for each reading. The usual method employed is to keep the cold junction in a vacuum bottle or other well insulated receptacle and note its temperature for each reading of the potentiometer or to have the thermo-couple leads of such length that the cold ends are of substantially the same temperature as the air.

Since it is very expensive to extend the leads of a rare-metal thermo-couple any appreciable distance, I have provided an auxiliary base-metal couple for measuring the temperature of the cold junction of the main thermo-couple, and I also provide a potentiometer for indicating the hot-junction temperature of the main thermo-couple directly, correcting for its cold-junction temperatures as measured by the auxiliary thermo-couple.

Although I have explained the principle and advantages of my invention, a better idea of its adaptability may be had by referring to the accompanying drawings, of which Figure 1 is a diagrammatic view of apparatus embodying my invention; Fig. 2 is a diagrammatic view of a modified form of my invention; Fig. 3 is a plan view of the arrangement of the pointer and dial of the potentiometer shown in Fig. 1 and Fig. 4 is a view of the dial and pointer shown partially in elevation and partially in section.

Referring to the accompanying drawings, my invention comprises a potentiometer 1, main rare-metal thermo-couples 2, a standard cell 3, a galvanometer 4, auxiliary base-metal thermo-couples 5 and a second source of electro-motive force 6.

The junction points 7 of the main thermo-couples 2 are inserted in receptacles 8, the temperatures of which are desired to be measured. The cold-junction terminals 9 and 10 of thermo-couples 2 are placed in well insulated receptacles 11, with the junction points 12 of the auxiliary thermo-couples 5. The terminals 9 of the thermo-couples 2 are connected together electrically by a conductor 13 that extends to a stationary contact member 14 of a switch 15. The movable contact member 16 of the switch 15 is connected to the galvanometer 4, and the other stationary contact member is connected to the standard cell 3 by a conductor 18. Referring now particularly to Figs. 1, 3 and 4, the conductor 18 divides at a point 19 to form a complete potentiometer circuit 20, comprising a fixed resistor 21, a second resistor 22, a third resistor 23, a source of electromotive force 6 and a fourth resistor 24. The resistor 23 is composed of two sections 25 and 26 connected in parallel relation. The permanent resistor section 26 is of such value that the voltage drop per division in the resistors 22 and 23 bear the same ratio to each other as the thermal increase of electromotive forces in the thermo-couples 2 and 5, respectively bear to each other. The remaining terminal of the galvanometer 4 is connected to a point 27 between the resistors 22 and 23. A movable contact member 28 engages the contact members with which the resistor 22 is provided and is connected by a conductor 29 to the movable spring-controlled member of a switch 30, the stationary member of which is connected to the movable contact member 31 of a multipoint switch 32, points 33 of which are connected to the terminals 10 of the respective main thermo-couples 2. A movable contact member 34 engages the stationary contact members with which the coil 25 of the resistor 23 is provided and is connected, by a conductor 35, to the spring-controlled movable contact member of a switch 36, the stationary contact member of which is connected to the movable contact member 37 of a multipoint switch 38. The several contact points 39 of the switch are connected to the terminals 40 of the respective auxiliary thermo-couples 5. The other terminals 41 of the thermo-couples 5 are connected together and to the stationary contact member 14 of the switch 15 by the conductor 13.

The modification of my invention shown in Fig. 2 differs from that shown in Fig. 1 in that the conductor 18 divides at the point 19 to form a complete potentiometer circuit 20 comprising a fixed resistor 21, a second resistor 42, a source of electromotive force 6, and a third resistor 24. A movable contact member 43 is adapted to engage the contact members with which the resistor 42 is provided and is connected to a point 44 on a resistor 45. The terminals 9 of the main thermo-couple 2 are connected together, as are the terminals 41 of the couples 5, and both sets of terminals are connected to a terminal 46 of the resistor 45. Terminal 47 of the resistor 45 is connected, by a conductor 48, to the movable contact member 49 of a multipoint contact switch 50, the stationary contact members 51 of which are connected through resistors 52, to the terminals 40 of the respective couples 5. The terminals 10 of thermo-couples 2 are connected to the stationary contact members 53 of a multipoint switch 54 the movable member 55 of which is connected, by a conductor 56, to the stationary contact member 14 of the switch 15. The point 44 is so located that the ratio of the resistance between the point 44 and a point 46$^a$ to the total resistance of the circuit inclosed by the points 46, 46$^a$, 41, 12, 40, 52, 51, 49, 48 and 47 equals the ratio of the increase in electromotive force of one main thermo-couple 2 to the increase in electromotive force of the increase in corresponding auxiliary thermo-couple 5. The point 44 may be determined experimentally since the electromotive forces of the thermo-couples are known and the resistance of the entire circuit may be measured by any of the well known methods. The resistors 52 are so proportioned that every auxiliary thermo-couple circuit has the same resistance.

The thermo-couples 2 and 5 should have the same thermo-electric characteristics between the limits through which they differ in temperature, that is, equal temperatures will produce relative thermo-electromotive forces. If the characteristics are the same, the resultant temperature may be read directly on a movable scale 57 by a movable pointer 58 or by a fixed scale and a movable pointer, as shown in the modified form of Fig. 2. Referring to Figs. 1, 3 and 4, the scale 57, having a knob 57$^a$, is connected by a suitable structure 59 to the contacting member 28 so that, when scale 57 is turned, the contact member 28 will make electrical contact on different parts of resistor 22. The pointer 58 is connected rigidly to the contact member 34. The terminals 40 and 41 of the thermo-couples 5 are assumed to be at such distance from the hot junctions 12 that they may be either maintained at a constant temperature or at the temperature of the air which may be determined by a thermometer.

The operation of my invention is similar to that of any direct-reading potentiometer in that the scale 57 and the pointer 58 are placed in their initial positions, the switch member 15 is placed in contact with the contact member 17, and the resistor 24 is adjusted until the galvanometer 4 shows no deflection. Since the voltage of the standard cell 3 is known and since the cells 3 and 6 are opposed to each other, when no current traverses the galvanometer 4 the potential drop across the resistors 22 and 23 is known. To take a reading or to compare the potential generated by the thermo-couples to the known potential drop, the multipoint switches are set on any pair of corresponding thermo-couples. The spring switch 30 is depressed and, with switch member 15 in engagement with the contact member 14, the pointer 58 is rotated until the galvanometer 4 reads zero. This is a measure of the generated potential of the thermo-couple 2. The spring-controlled switch 30 is next released and the spring-controlled switch 36 is depressed to place the auxiliary thermo-couples in circuit, then the scale 57 is rotated by the knob 57$^a$ until the galvanometer again comes to zero. This is a measure of the generated potential of the thermo-couple 5. The reading of pointer 58 on scale 57 will be proportional to the temperature of the receptacle 8. Since the pointer 58, with the scale 57 in its initial position, indicates the generated potential of the thermo-couple 2 and this is proportional to the difference in temperature between the junctions 7 and 12 of the thermo couples 2 and 5, respectively, and since the distance the scale 57 is moved from its initial position indicates, for the same reason, the difference in temperature between the junction 12 and the terminals 40 and 41 that are maintained at zero degrees, the indication of the pointer 58 on the scale 57 indicates the sum of the two readings or the temperature of the receptacle 8.

The modification of my invention shown in Fig. 2 is operated similarly to the one shown in Fig. 1 with the exception that, as there is only one fixed scale and one movable pointer that reads directly on the fixed scale, the temperature can be read off directly after the resistors 24, 45 and 52 have been adjusted, as hereinbefore explained. This will be readily seen, since the potential generated by the thermo-couple 2 is increased in proportion to the difference in temperature between the hot and cold junctions of the thermo-couple 5.

Although I have described the details of operation, and the principle of my invention together with the apparatus which I now consider the most advanced and the best embodiment thereof, I do not limit my invention to any particular form of construction, or material, since many changes may be made without departing from the spirit of my invention.

I claim as my invention:

1. A temperature-measuring instrument comprising two thermo-couples and a potentiometer operatively connected to the thermo-couples and adapted to determine the difference in temperature between the hot and cold junctions thereof and to indicate the sum of said temperature differences.

2. A measuring instrument comprising a main and an auxiliary thermo-couple, a receptacle containing the cold junction of the main and the hot junction of the auxiliary thermo-couple, a potentiometer operatively connected to the thermo-couples for determining the difference in temperature between the junctions of the main thermo-couple, and means operatively connected to the auxiliary thermo-couple for increasing this indication an amount proportional to the difference in temperature between the junctions of the auxiliary thermo-couple.

3. In a temperature-measuring instrument, the combination with a main thermo-couple, of a receptacle containing the cold junction of said thermo-couple, a second thermo-couple having its hot junction also in said receptacle and in close proximity to the cold junction of said main thermo-couple, means connected to said main thermo-couple for measuring the difference in temperature between its hot and cold junctions, means connected with said second thermo-couple for measuring the difference in temperature of the cold junction of said main thermo-couple and the temperature of the room, and means for indicating the temperature of the hot junction of said main thermo-couple.

4. In a temperature-measuring instrument, the combination with a main thermo-couple, of a receptacle containing the cold junction of said thermo-couple, a second thermo-couple having its hot junction also in the said receptacle and in close proximity to the cold junction of the main thermo-couple, and potentiometer circuits operatively connected to the thermo-couples for determining the temperature differences of the junctions of the thermo-couples and for measuring thereby directly the temperature of the hot junction of the main thermo-couple.

5. In a temperature-measuring instrument, the combination with a main thermo-couple, of a receptacle containing the cold junction of said thermo couple, a second thermo-couple having its hot junction also in said receptacle and in close proximity to the cold junction of said main thermo-couple, potentiometer circuits comprising a source of electromotive force, a standard cell, a galvanometer, a plurality of resistances, and a plurality of circuit interrupters for determining the difference in temperature between the hot and cold junctions of said main thermo-couple, and means for increasing this indication an amount proportional to the difference in temperature between the hot and cold junctions of said second thermo-couple.

6. In a temperature-measuring instrument, the combination with a main thermo-couple, of a receptacle containing the cold junction of said thermo-couple, a second thermo-couple having its hot junction also in said receptacle and in close proximity to the cold junction of said main thermo-couple, a potentiometer circuit comprising an adjustable resistor having an indicating pointer fixed to its movable member, a second adjustable resistor located below said first resistor, a movable scale fixed to said second resistor, a resistor in shunt to said second resistor, a standard cell, a second source of electromotive force, a galvanometer, and a plurality of conductors for electrically connecting said movable members to the respective thermo-couples, said pointer and scale being arranged to indicate the temperature of the hot junction of the said main thermo-couple.

7. The combination with a main and an auxiliary thermo-couple and a receptacle for containing the cold junctions of the main and the hot junction of the auxiliary thermo-couple, of a potentiometer operatively connected to the thermo-couples and comprising means for so determining the differences in temperatures between the hot and cold junctions of each thermo-couple that the sum of the effects of the thermal electromotive forces of the two thermo-couples on the potentiometer is an indication of the temperature of the hot junction of the main thermo-couple.

8. The combination with a main and an auxiliary thermo-couple and an inclosing receptacle for the cold junction of the main and the hot junction of the auxiliary thermo-couple, of a potentiometer comprising two coöperating potentiometer conductors one of which is connected to one thermo-couple and the other of which is operatively connected to the other thermo-couple, and means operatively connected therewith for indicating the sum of the effects of the thermal-electromotive forces on the potentiometer as determined by the potentiometer conductors.

9. The combination with a main and an auxiliary thermo-couple having relatively different thermal-electric characteristics, of means operatively connected to the auxiliary thermo-couple to cause its thermal-electric characteristics to correspond to that of the main thermo-couple, and a potentiometer operatively connected to the main thermo-couple and the said means for changing the characteristics of the auxiliary thermo-couple for determining the sum of the temperature differences between the hot and cold junctions of the said thermo-couples.

In testimony whereof, I have hereunto subscribed my name this 26th day of May, 1913.

THOMAS SPOONER.

Witnesses:
B. B. HINES,
M. C. MERZ.

It is hereby certified that in Letters Patent No. 1,227,337, granted May 22, 1917, upon the application of Thomas Spooner, of Wilkinsburg, Pennsylvania, for an improvement in "Temperature-Measuring Instruments," errors appear in the printed specification requiring correction as follows: Page 1, line 99, strike out the word "thermal," and same line after the word "of" insert the word *thermal;* page 2, line 51, strike out the words "increase in"; same page, line 54, before the word "electromotive" insert the words *increase in;* and that the said Letters Patent should be read with these corrections therein that the same may conform to the record of the case in the Patent Office.

Signed and sealed this 17th day of July, A. D., 1917.

[SEAL.]

F. W. H. CLAY,
*Acting Commissioner of Patents.*

Cl. 73—32.